Dec. 6, 1938. R. R. ROBERTSON 2,139,465
CONTRACTION JOINT WITH PERIPHERAL SEAL
Filed Sept. 28, 1936
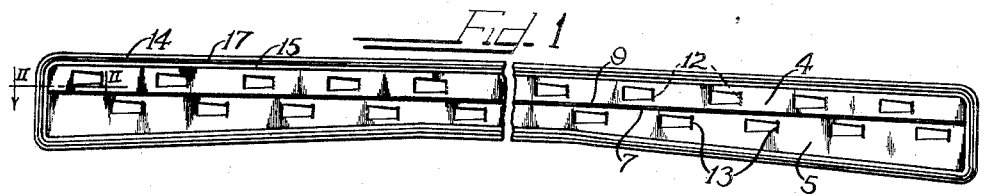
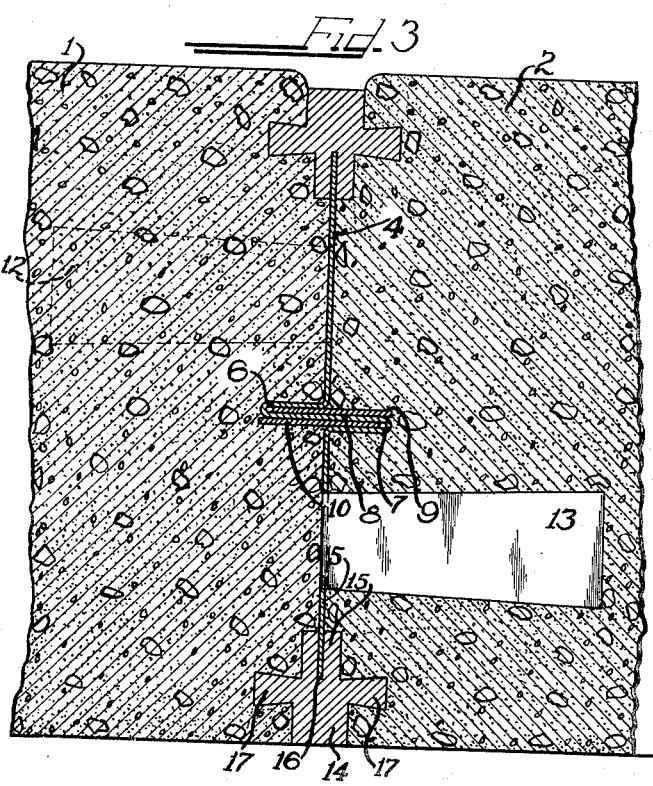
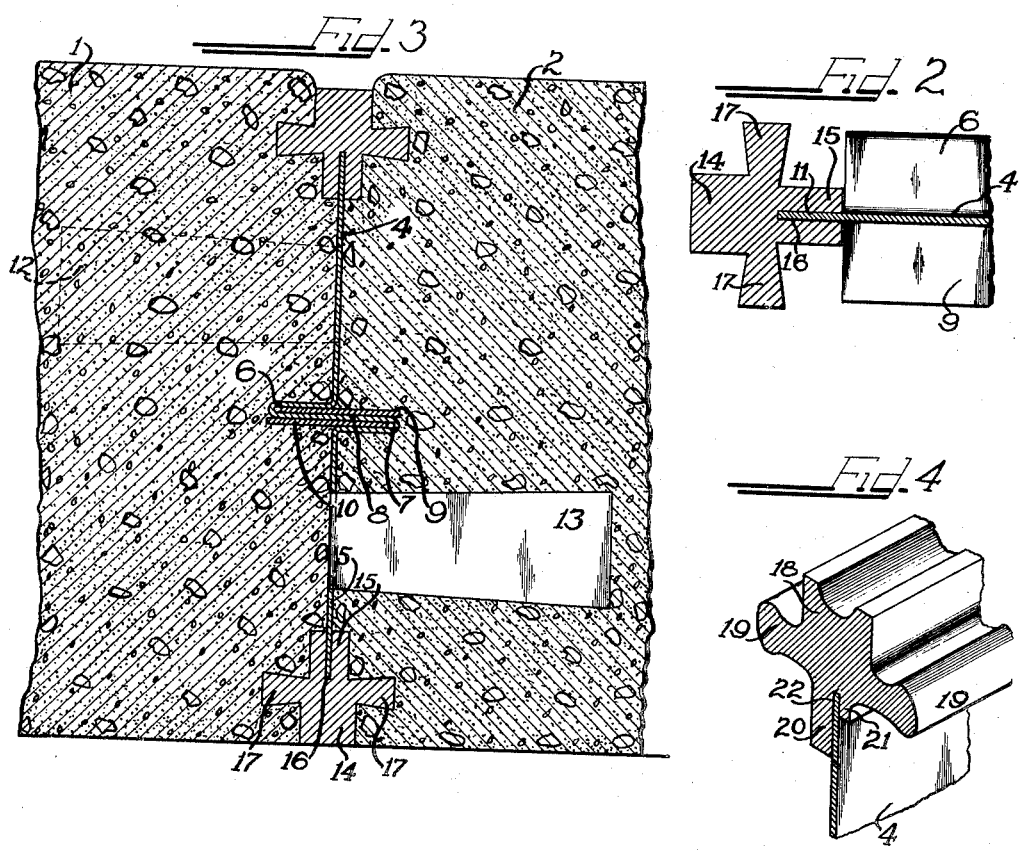
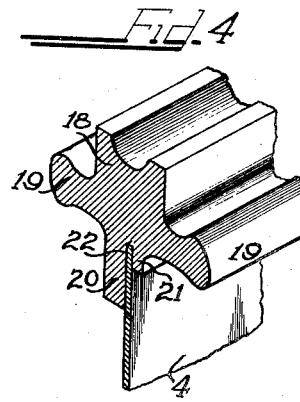
Inventor
ROBERT R. ROBERTSON Patented Dec. 6, 1938

2,139,465

UNITED STATES PATENT OFFICE 2,139,465

CONTRACTION JOINT WITH PERIPHERAL SEAL

Robert R. Robertson, Chicago, Ill., assignor to The Translode Joint Company, Chicago Heights, Ill., a corporation of Illinois Application September 28, 1936, Serial No. 102,909

7 Claims. (Cl. 94—18)

This invention pertains to a concrete contraction joint forming mechanism similar to that covered in my application for patent for "Center and transverse contraction joints", filed July 6, 1936, U. S. Patent No. 2,119,355 patented May 31, 1938, said mechanism comprising a contraction joint plate, the intermediate portion of which throughout the length of the plate is deflected to provide a transverse shield strengthened by means of reinforcing plates interfitting with the shield and projecting into the concrete slabs on opposite sides of the joint, said contraction joint plate having the shield portions thereof adjacent the ends of the plates cut off to permit an improved preformed compressible and flexible seal to be engaged around the entire peripheral margin of the contraction joint plate to form top, bottom and end seals for the joint.

It is an object of this invention to provide a contraction joint for embedding in a concrete construction, with said joint having a preformed compressible and flexible seal member engaged around the top, bottom and ends of the point to seal the same.

It is also an object of this invention to provide a road contraction joint forming mechanism wherein the metal plate forming the main body portion of the joint forming mechanism has engaged over the top, bottom and end margins thereof a continuous preformed compressible and resilient seal provided with integral anchoring ribs on the sides thereof for embedding in adjacent concrete road slabs between which the contraction joint forming mechanism is disposed.

Another object of the invention is to provide a contraction joint mechanism wherein the joint plate has anchoring blades struck therefrom, and wherein the middle portion of the plate is deflected upon itself to provide an intermediate transverse shield having reinforcing plates interfitting therewith, said joint plate being of a length to permit the same to extend entirely across the width of a road and having engaged around the entire periphery thereof a preformed peripheral seal constructed of rubber or other suitable material, said rubber seal having integrally formed on the sides thereof dovetailed anchoring ribs for embedding in adjacent road slabs to complete the peripheral seal and permit said seal to be transversely stretched with the widening of the contraction joint due to the contraction of the concrete road slabs produced by temperature changes.

It is furthermore an object of this invention to provide a concrete road contraction joint forming mechanism wherein the contraction joint plate has fitted over the top, bottom and end margins thereof, a substantially continuous preformed compressible and expansible seal strip comprising four wings positioned substantially at right angles with respect to one another with the inner wing slotted for engagement over the peripheral margins of the entire contraction joint plate.

Another object of the invention is to provide a road contraction joint with a peripheral seal of pre-molded construction and provided with side extensions for embedding in adjacent concrete road slabs to permit widening of the peripheral seal with the contraction of the road slab due to temperature changes or the like.

It is an important object of this invention to provide a road contraction joint wherein the joint body plate is provided with a reinforced transverse integral shield and wherein the entire periphery of the joint plate has frictionally engaged thereon a continuous compressible and expansible seal, the sides of which have integrally formed thereon projecting continuous anchor ribs for widening the seal within the body of the concrete of the road and affording means whereby the peripheral seal may be transversely stretched with the contraction of the road slabs due to temperature changes.

Other and further important objects of this invention will be apparent from the disclosures in the specification and the accompanying drawing.

The invention (in preferred forms) is illustrated in the drawing and hereinafter more fully described.

On the drawing:

Figure 1 is a fragmentary side elevation of an improved road contraction joint including a continuous peripheral seal engaged around the top, bottom and ends of the joint plate.

Figure 2 is an enlarged fragmentary horizontal detail section taken on lines II—II of Figure 1 and illustrating the end of the transverse shield of the joint cut away to permit the end seal to engage over the end margin of the contraction joint plate.

Figure 3 is a fragmentary vertical detail section taken through a contraction joint embedded between concrete road slabs and illustrating in section the upper and lower seals of the joint and the reinforcement of the transverse intermediate shield forming part of the contraction joint plate.

Figure 4 is an enlarged fragmentary perspective view of a modified form of a contraction joint peripheral seal illustrating a portion of the contraction joint plate on which the seal is engaged.

As shown on the drawing:

The reference numerals 1 and 2 indicate adjacent concrete road slabs having embedded therebetween an improved contraction joint forming mechanism embodying the principles of this invention. The contraction joint forming mechanism comprises a sheet metal body plate having the middle or intermediate portion thereof deflected or formed to provide a transverse shield separating an upper plate 4 from a lower plate 5. The transverse shield extends substantially throughout the entire length of the joint forming unit and comprises an upper looped section or channel portion 6 and a lower looped section or channel portion 7 which extend in opposite directions beyond the sides of the plates and are connected by means of a common transverse plate 8. Disposed upon the top surface of the common plate 8 and projecting into the looped or channel section 6 is a top reinforcing plate 9 which extends outwardly into the concrete road slab 2 to the outer side of the lower looped or channel portion 7. Engaged beneath the common plate 8 and projecting into the channel of the lower looped or channel section 7 is a lower reinforcing plate 10 which extends into the concrete road slab 1 to the outer side of the upper looped or channel section 6.

As clearly illustrated in Figure 2, the ends of the transverse shield sections 6 and 7 as well as the reinforcing plates 9 and 10 are cut off at both ends of the contraction joint to leave plain end margins 11 on the contraction joint plates.

For the purpose of anchoring the contraction joint plate members 4 and 5 in the adjacently disposed concrete road sections 1 and 2, the top plate section 4 has struck outwardly therefrom a plurality of anchoring blades 12 which are adapted to be embedded in the concrete road slab 1. Struck outwardly in an opposite direction from the bottom contraction joint plate 5 are a plurality of anchoring blades 13 which project in a direction to permit the same to be embedded in the concrete road slab 2 as clearly illustrated in Figure 3.

As clearly illustrated in Figure 1, the contraction joint plate mechanism extends transversely across a road subgrade from one side of the road to the other and is provided with a substantially continuous peripheral seal which extends across the top, bottom and around the ends of the contraction joint body plates. The improved peripheral seal is preformed or premolded out of rubber or a corresponding suitable material which is compressible and expansible. In the form of the peripheral seal illustrated in Figures 1 to 3 inclusive, it comprises a main or outer peripheral sealing strip 14 having integrally formed on the inner periphery thereof an inner peripheral sealing strip 15 which is narrower than the outer strip 14 and is provided with a middle slit or groove at 16 to permit the seal to fit over the top, bottom and end margins of the body plate members 4 and 5 forming the main body of the contraction joint. Integrally formed on the opposite sides of the outer joint sealing strip 14 are dovetailed cross-sectioned anchoring ribs or side strips 17, which as clearly illustrated in Figure 3 are adapted to be embedded in the adjacently disposed concrete road slabs 1 and 2 on opposite sides of the joint forming mechanisms.

The continuous peripheral seal constructed of a compressible and expansible material may be formed in a single length and may be engaged around the peripheral margins of the contraction joint body plates allowing the ends of the peripheral seal to abut one another at the top, bottom or at any other convenient location where the abutting ends of the seal may be suitably connected or closed by means of a cap or the like.

Figure 4 illustrates a modified form of the peripheral seal engaged upon a contraction joint plate 4. The modified form of the seal comprises a grooved outer band or strip 18 having integrally formed on the opposite sides thereof outwardly projecting longitudinally grooved anchoring ribs or strips 19 adapted to be embedded in adjacent concrete road slabs similar to the arrangement illustrated in Figure 3. Integrally formed on the inner periphery of the outer seal strip 18 is an inner seal strip comprising a wide rib 20 and a narrower and thinner rib 21 separated by a groove 22 to permit the seal to be engaged over and around the margins of the contraction joint plate.

It will of course be understood that various details of construction may be varied through a wide range without departing from the principles of this invention and it is therefore not the purpose to limit the patent granted hereon otherwise than necessitated by the scope of the appended claims.

I claim as my invenion:

1. A contraction joint forming mechanism for embedding between concrete road slabs and comprising a metal body section, and a premolded compressible and expansible peripheral seal engaged around the top, bottom and end margins of the body section, and anchoring ribs integrally formed on the sides of the seal and embedded in the concrete road slabs to cause widening of the seal with the contraction of the concrete road slabs.

2. A contraction joint forming mechanism for embedding between concrete road slabs and comprising a main body plate, anchoring members struck therefrom in opposite directions for anchoring opposite sides of the body plate to the adjacent concrete road slabs, a shield section integrally formed from the body plate and projecting transversely through the plane of said body plate, reinforcing plates interfitting with the shield section, and a preformed compressible and expansible peripheral seal made to engage over the top, bottom and end margins of the body plate to form a continuous seal around the body plate and between the adjacent concrete road slabs.

3. A contraction joint mechanism for embedding between concrete road slabs, said mechanism comprising in combination a plate having the middle portion thereof folded upon itself to form a double looped transverse shield with the loops projecting from opposite sides of the plate and integrally connected by a common plate projecting through the plane of the main plate, means for anchoring diagonally opposite surfaces of the main plate in the concrete slabs on opposite sides of the joint, and a preformed compressible and expansible seal fitted over the edges of the main plate and embedded between the concrete road slabs to provide a continuous peripheral seal around the contraction joint mechanism.

4. A contraction joint mechanism for embedding between concrete road slabs, said mechanism comprising in combination a main plate having the middle portion thereof folded upon itself to form a double looped transverse shield with the loops projecting from opposite sides of the plate and integrally connected by a common plate projecting through the plane of the main plate, reinforcing plates interfitting the looped transverse shield to strengthen the same, anchoring blades struck outwardly from opposite sides of the main plate to be embedded in the adjacent concrete road slabs, a preformed slotted seal engaged over the top, bottom and end margins of the main plate to form a continuous seal around the joint mechanism, and means integrally formed on the opposite sides of the slotted seal and embedded in the adjacent concrete road slabs.

5. In a contraction joint for embedding between adjacent concrete slabs, a contraction joint forming mechanism comprising a metal plate formed to provide a transverse shield separating the upper portion of the plate from the lower portion, means for reinforcing the transverse shield, a frame-like slotted elastic seal engaged entirely around the periphery of the metal plate, and elastic anchoring ribs integrally formed on opposite sides of the seal and respectively embedded in the opposite concrete slabs to permit widening of the seal with the contraction of the concrete slabs due to temperature changes.

6. In a joint for embedding between adjacent concrete slabs, a joint body plate, and a peripheral seal engaged completely around the edges of the body plate, said seal comprising an elastic preformed compressible and expansible strip having continuous elastic anchoring ribs integrally formed on opposite sides thereof for embedding in the concrete slabs to cause variations in the width of the peripheral seal with the movement of the concrete slabs produced by temperature changes.

7. In a joint forming mechanism the combination with a body plate, of a continuous seal of compressible and expansible material engaged around the edges of the body plate and comprising a main body strip, a slotted mounting strip integrally formed on the bottom thereof, and dovetailed ribs integrally formed on the sides of the main body strip.

ROBERT R. ROBERTSON.